US010302332B2

(12) United States Patent
Poscharnig et al.

(10) Patent No.: US 10,302,332 B2
(45) Date of Patent: May 28, 2019

(54) SOLAR COLLECTOR

(71) Applicant: GREENoneTEC Solarindustrie GmbH, St. Veit (AT)

(72) Inventors: Harald Poscharnig, Maria Saal (AT); Gunter Koschier, Launsdorf (AT); Martin Schoffmann, Klagenfurt (AT)

(73) Assignee: GREENone TEC SOLARINDUSTRIE GmbH, St. Veit (AT)

( * ) Notice: Subject to any disclaimer, the term of this patent is extended or adjusted under 35 U.S.C. 154(b) by 598 days.

(21) Appl. No.: 15/040,620

(22) Filed: Feb. 10, 2016

(65) Prior Publication Data

US 2016/0252273 A1    Sep. 1, 2016

(30) Foreign Application Priority Data

Feb. 27, 2015    (EP) ..................................... 15156910

(51) Int. Cl.
*F24S 10/40*    (2018.01)
*F24S 80/40*    (2018.01)
(Continued)

(52) U.S. Cl.
CPC .............. *F24S 10/40* (2018.05); *F24S 25/00* (2018.05); *F24S 40/42* (2018.05); *F24S 80/40* (2018.05);
(Continued)

(58) Field of Classification Search
CPC .. F24S 10/40; F24S 25/00; F24S 40/42; F24S 80/60; F24S 80/40; F24S 80/50;
(Continued)

(56) References Cited

U.S. PATENT DOCUMENTS 2,684,266 A * 7/1954 Englehart ........... E06B 3/66314
239/34
3,990,429 A * 11/1976 Mazzoni ................. E06B 3/677
126/712
(Continued)

FOREIGN PATENT DOCUMENTS

DE    19954238 A1    9/2000
DE    10216625 A1    10/2003
(Continued)

*Primary Examiner* — Jason Lau
(74) *Attorney, Agent, or Firm* — Ralph E. Jocke; Walker & Jocke

(57) ABSTRACT

A solar collector includes a box shaped collection space bounded by a rectangular bottom (10), a frame (12), and an outer rectangular glass pane (14). The box shaped collection space includes therein an inner rectangular glass pane (16) that is disposed in a first direction from the bottom and is separated from the outer rectangular glass pane by spacers (18). An absorber sheet (20) and at least one fluid conducting riser (22) are positioned intermediate of the bottom and the inner rectangular glass pane. At least two ventilation caps (30) extend in overlying relation of respective corners of the solar collector. Inner sides (32I) of the ventilation caps include a pattern (34P, 34Z) of air ventilation passages that provide at least one ventilation channel that extends from outside the collector space to between the inner and outer rectangular glass panes.

15 Claims, 5 Drawing Sheets

(51) Int. Cl.
*F24S 80/60* (2018.01)
*F24S 25/00* (2018.01)
*F24S 80/50* (2018.01)
*F24S 40/42* (2018.01)

(52) U.S. Cl.
CPC ............... *F24S 80/50* (2018.05); *F24S 80/60* (2018.05); *F24S 2025/011* (2018.05); *F24S 2080/502* (2018.05); *Y02E 10/40* (2013.01)

(58) Field of Classification Search
CPC .. F24S 40/55; F24S 40/57; F24S 40/85; F24S 40/80
See application file for complete search history.

(56) References Cited

U.S. PATENT DOCUMENTS

| | | | | |
|---|---|---|---|---|
| 3,995,613 A | * | 12/1976 | Patil | F24S 10/504 126/704 |
| 3,995,804 A | * | 12/1976 | Folds | F24S 10/60 126/675 |
| 3,999,536 A | * | 12/1976 | Bauer | F24S 10/504 126/710 |
| 4,003,363 A | | 1/1977 | Grossman | |
| 4,043,317 A | * | 8/1977 | Scharfman | F24S 40/53 126/596 |
| 4,046,134 A | * | 9/1977 | Scott | F24S 10/73 126/599 |
| 4,067,317 A | * | 1/1978 | Hubbard | F24S 10/502 126/664 |
| 4,098,259 A | * | 7/1978 | Barber, Jr. | F24S 10/753 126/661 |
| 4,123,883 A | * | 11/1978 | Barber, Jr. | F24S 25/61 52/200 |
| 4,132,217 A | * | 1/1979 | Rom | F24S 10/50 126/675 |
| 4,219,009 A | * | 8/1980 | Palmer | F24S 50/40 126/599 |
| 4,226,225 A | * | 10/1980 | Niedermeyer | F24S 50/00 126/594 |
| 4,231,204 A | | 11/1980 | Krueger et al. | |
| 4,242,389 A | | 12/1980 | Howell | |
| 4,267,706 A | * | 5/1981 | Abraham | A47F 3/0447 62/256 |
| 4,278,070 A | * | 7/1981 | Bowen | F24S 25/61 126/704 |
| 4,341,200 A | * | 7/1982 | Bowen | F24S 25/61 126/704 |
| 4,351,230 A | * | 9/1982 | Brickner | B65D 88/741 34/235 |
| 4,382,436 A | * | 5/1983 | Hager | E06B 7/02 126/630 |
| 4,397,305 A | * | 8/1983 | Keefe | F24S 40/53 126/665 |
| 4,478,366 A | * | 10/1984 | Coddens | F24F 7/007 165/248 |
| 4,498,458 A | * | 2/1985 | Soper | F24S 10/25 126/628 |
| 4,503,840 A | * | 3/1985 | Chertok | F24S 10/503 126/624 |
| 4,569,330 A | * | 2/1986 | Pettersson | F24S 40/40 126/570 |
| 4,690,128 A | * | 9/1987 | Gibbons | F24S 60/00 126/705 |
| 5,353,601 A | * | 10/1994 | Palmer | F24F 1/02 62/171 |
| 5,561,952 A | * | 10/1996 | Damron | E04D 13/0325 454/199 |
| 5,561,953 A | * | 10/1996 | Rotter | E04D 3/30 454/365 |
| 5,653,222 A | * | 8/1997 | Newman | F24S 80/52 126/653 |
| 6,695,692 B1 | * | 2/2004 | York | E04D 13/0325 454/199 |
| 6,763,826 B1 | * | 7/2004 | Gumm | F24S 23/31 126/599 |
| 6,814,070 B2 | * | 11/2004 | Bourne | F24S 25/61 126/623 |
| 7,143,762 B2 | * | 12/2006 | Harrison | F24S 10/50 126/589 |
| 7,748,137 B2 | * | 7/2010 | Wang | A01G 9/22 34/396 |
| 8,220,453 B2 | * | 7/2012 | Bourke | F24D 17/0021 126/638 |
| 8,281,522 B1 | * | 10/2012 | Hawryshko | E04D 13/178 454/260 |
| 9,157,239 B2 | * | 10/2015 | Allen | E04D 13/17 |
| 9,159,857 B2 | * | 10/2015 | Kuo | H01L 31/042 |
| 9,163,846 B2 | * | 10/2015 | Cull | F24F 7/02 |
| 9,263,985 B2 | * | 2/2016 | Silberschatz | H02S 30/10 |
| 9,266,405 B1 | * | 2/2016 | Blanchard | B60H 1/00457 |
| 9,340,963 B2 | * | 5/2016 | Ito | E04H 1/1266 |
| 9,410,325 B2 | * | 8/2016 | Koehler | F24J 2/5228 |
| 9,496,822 B2 | * | 11/2016 | Gerwing | H02S 20/00 |
| 9,773,933 B2 | * | 9/2017 | Meyer | F24S 25/65 |
| 2009/0231807 A1 | * | 9/2009 | Bouissiere | H05K 7/20972 361/690 |
| 2010/0095610 A1 | * | 4/2010 | Hariharan | F24F 5/0046 52/173.3 |
| 2011/0277386 A1 | * | 11/2011 | Nevins | H02S 20/30 49/58 |
| 2012/0059214 A1 | * | 3/2012 | Zhou | A61F 2/2481 600/16 |
| 2012/0264362 A1 | * | 10/2012 | Choi | H01M 8/2475 454/184 |
| 2013/0027849 A1 | * | 1/2013 | Berumen | A45C 11/00 361/679.01 |
| 2013/0149107 A1 | * | 6/2013 | Munshi | F01D 25/12 415/116 |
| 2013/0247830 A1 | * | 9/2013 | Bell | A01K 1/0107 119/166 |
| 2013/0326972 A1 | * | 12/2013 | Aschauer | E04B 1/7069 52/173.3 |
| 2014/0001932 A1 | * | 1/2014 | Westby | H02B 1/565 312/223.1 |
| 2015/0247652 A1 | * | 9/2015 | Coulter | F24F 5/0046 126/632 |
| 2017/0059184 A1 | * | 3/2017 | Haynes | F24D 5/005 |
| 2017/0328121 A1 | * | 11/2017 | Purdy | E06B 3/6612 |

FOREIGN PATENT DOCUMENTS

| | | | |
|---|---|---|---|
| DE | 102006061284 A1 | 6/2008 | |
| EP | 2437002 A1 | 4/2012 | |
| GB | 2460104 A | * 11/2009 | ............. F24F 7/025 |
| JP | 358198644 A | 11/1983 | |
| JP | 111325610 A | 11/1999 | |
| WO | WO 2013114205 A1 | * 8/2013 | ............... F24F 7/02 |

* cited by examiner

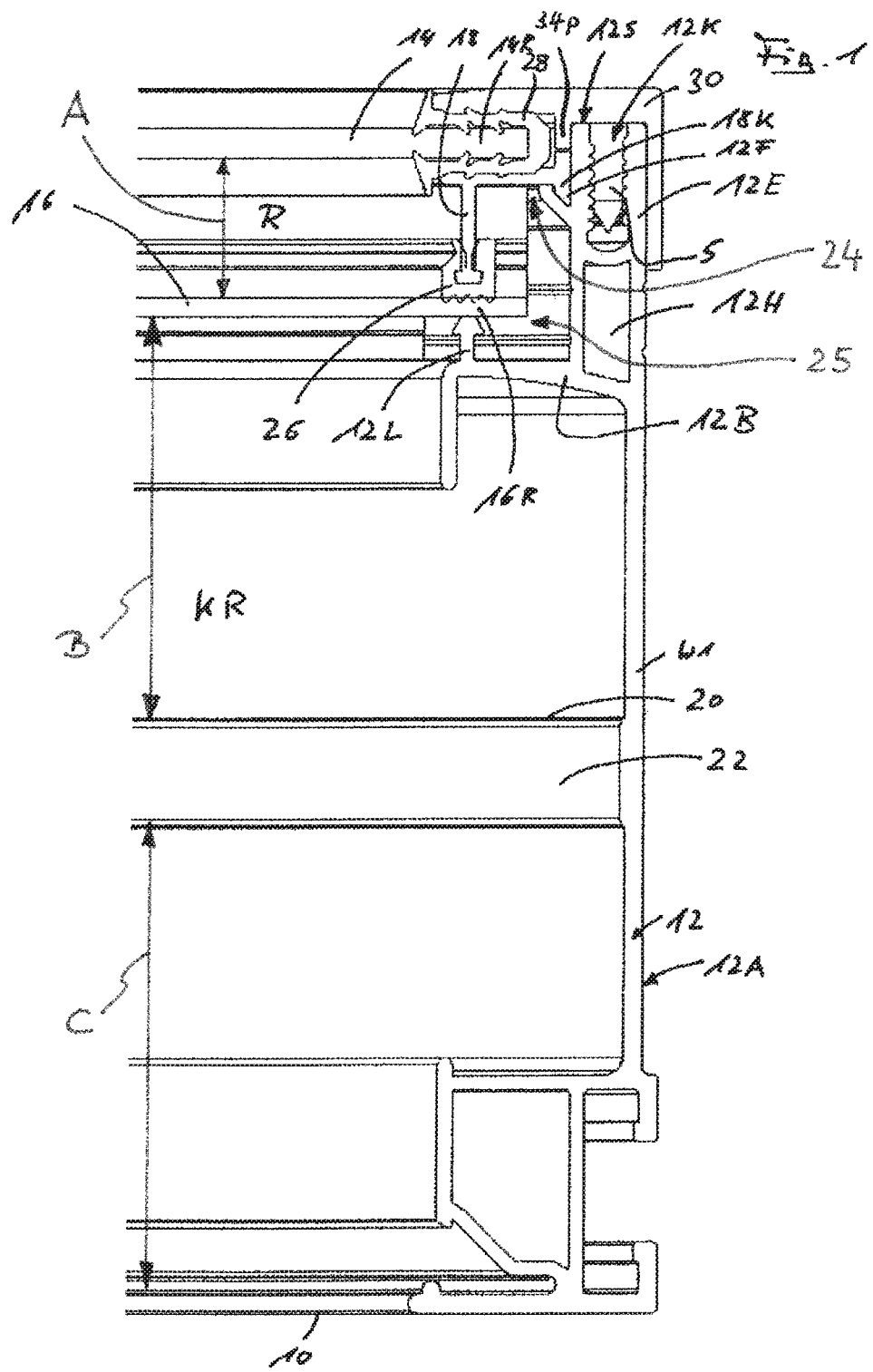

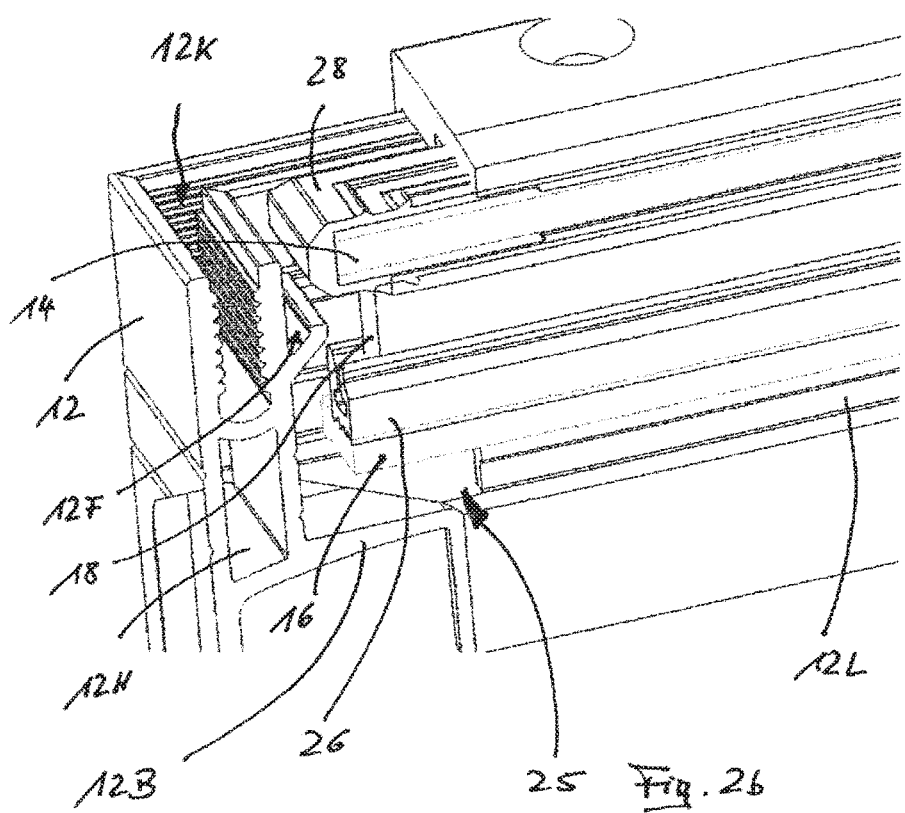

SOLAR COLLECTOR

TECHNICAL FIELD

The invention relates to a solar collector, as well called solar heat collector or sun collector. Such a solar collector (solar panel) serves to transform solar energy into heat and in particular for the preparation of warm water for private, commercial or industrial purposes.

BACKGROUND

An important part of each solar panel is the "absorber", which in most cases is made of an absorber sheet and a riser. The riser often comprises one or more pipes, for example with a diameter between 6 to 12 mm and corresponding collecting pipes, for example of diameters between 15 and 40 mm. The said pipes may be smaller or bigger, depending on the collector type.

A known riser/pipe arrangement is designed similar to a "harp", wherein several risers are arranged, parallel to each other, between two collecting pipes. In another embodiment the risers following the collector pipe, are arranged in a meander-like shape.

If not disclosed otherwise or self-evident from the context, the following disclosure refers to a complete solar panel in its use position, especially with its transparent upper side towards the sun.

While solar panels for private purposes to support a warm water and heating water demand in a temperature range up to approximately 50° C. are mostly designed in a basic construction, often with just one ordinary cover (mostly made of glass) on its side facing the sun, much hotter water is needed for industrial/commercial purposes, for example to support a district heating network.

Insofar a better thermal insulation is required for these panels to reduce possible heat losses of the panel, in particular by convective flow.

A known system provides for a transparent foil between the transparent cover and the absorber sheet. The said foil is used to interrupt any convective flow and thus any heat transport to the glass pane. It is a disadvantage of this system that the said foil must be strained to avoid any contact with the absorber. It was also realized that the said foil may tear.

Another known embodiment uses a double glazed cover instead of a single glazed one. The double glazed version can be realized as an insulating pane (the intermediate space filled with a gas) or with air between the two glass panes. The use of an insulating pane is critical as the temperatures within the collector housing (collector space) may become very high and may not be controlled any more. This design is therefore not suitable for a mass production with guarantees of up to 10 years.

With an embodiment using air between the glass panes, the following could be observed: The different temperatures adjacent to both glass panes cause different thermal expansions of both glass panes, while the glass panes are prevented from expanding differently by the gas tight connection. The tensions may be that high, that the double pane bursts.

Another disadvantage is that moisture (condensate) can accumulate between the panes. Because of varying temperatures in the collector space the pressure in said space between the panes varies. This collector type must further withstand other compression and tension forces, caused by wind and snow loading, which may be as high as 600 kg/m$^2$.

SUMMARY EXEMPLARY EMBODIMENTS OF INVENTION

It is an object of the invention to provide a solar collector, which does not feature the disclosed disadvantages. The efficiency of known collectors should be improved. The collector should further be applicable to industrial and commercial use, i.e. for high performance collectors which provide useful heat of a high temperature (for example >80° C.).

The invention starts from a double glazed collector with air between the glass panes (the term glass includes other, in particular transparent materials, which are translucent).

However: the space between the panes is not closed hermetically (air-tight); to the contrary: the panes are arranged in such a fashion, that air may flow in a controlled manner through said interstice/space between the panes. This forced convection is wanted. But the efficiency of the collector, compared with its optimum, is slightly reduced; on the other hand the described disadvantages of a closed (air-tight) double glazing (double panes) may be avoided.

A fluidic connection for said air to the outside (environment) is further provided, so that the following air paths are achieved:
  air may flow from the environment (from outside) into the collector space and thus into the interstice between the panes,
  air may flow through said space between the panes,
  the air may leave the interstice between the panes of glass and thereafter leave the collector inner space back into the surrounding.

To achieve this flow-through at least two ventilation openings or ventilation channels per collector are proposed in order to allow at least one air entrance and at least one air exit and thus a good flow through the space between the panes.

The size of the openings or ventilation channels respectively should follow the following criteria:
  It should be avoided that moisture enters the collector space from the outside. Insofar the openings/ventilation channels have a relatively small cross-section. From this it becomes evident that the said openings must be arranged in a way avoiding the ingress of moisture from the environment, for example rain. This may be achieved in its most simple embodiment by sucking the air vertically from the bottom upwardly which then leaves the collector in a reciprocal way.
  The heat loss caused by convection should be as small as possible, but a minimum convection is desired, to avoid the deposit of a condensate/precipitate between the panes.
  As a result: for a specific solar panel a compromise must be found with respect to its dimensions.
  For a solar collector (for panels with several sections, as displayed in FIG. 5, these data relate to each individual part) with B(width)=0.5-1.5 m, L(length)=1.0-3.0 m and T(height)=0.05-0.25 m, the cross section of the smallest opening may be as follows:
    between 3 mm$^2$ and 40 mm$^2$
    with optional lower limits at 5 mm$^2$, 7 mm$^2$, 8 mm$^2$ or 10 mm$^2$
    with optional upper limits at 35 mm$^2$, 30 mm$^2$, 25 mm$^2$ or 20 mm$^2$ The opening between collector and environmental atmosphere (i.e. the place, where air enters from the environment in the collector or the place, where air, deriving from the collector, is redirected into the atmosphere) can be the smallest and should be selected according to the dimensions stated above. In other words: The cross-sections of the ventilation openings in the ventilation cap are decisive and define the amount of air, which flows through the panel. The cross-sections of the openings/passageways and flow paths for the air within the collector can be much larger.

This panel design allows a ventilation of the interstice between the panes and avoids the precipitation of moisture within the collector.

Preferably, the one or more ventilation channels feature one or more by-pass sections (deviations); they extend, for example, in a zigzag pattern or like a meander. This has the advantage that any humidity (moisture), which enters the panel unintentionally, or any moisture which originates from the ventilation channel, may be separated again and may be disposed.

A dust precipitation is achieved analogously so that the collector may also be used in a dust rich atmosphere.

In its most general embodiment the invention relates to a solar collector comprising:
a) a rectangular bottom,
b) a frame, extending from an outer periphery of the bottom and perpendicular to said bottom (10), which frame comprises four wall sections and four corner sections,
c) an outer, rectangular glass pane, which is fastened to said frame at an upper end of said frame, which upper end being arranged opposite to said bottom,
d) an inner, rectangular glass pane, which is fastened to said frame at a distance to the outer glass pane between outer glass pane and bottom, wherein
e) said distance between inner and outer glass panes and thus a space between inner and outer glass panes is defined by spacers, connecting said inner and outer glass panes at their respective peripheral areas,
f) an absorber sheet, arranged at a distance to said inner glass pane between said inner glass pane and said bottom,
g) at least one riser arranged at distance to said bottom between said absorber sheet and said bottom, wherein
h) said bottom, said frame and said outer glass pane define a box-shaped collector space, and
i) the bottom, the outer glass pane, the inner glass pane, the absorber sheet and the risers extend predominantly parallel to each other, as well as
j) at least two ventilation caps arranged at a distance to each other, and each cap comprising:
  j1) a first section, abutting with an inner side against an outer side of the frame at the upper end of said frame,
  j2) a second section, extending orthogonally to the first section, overlapping with an inner side a terminal upper front face of the frame, wherein
  j3) the inner sides of both first and second sections each display a pattern, providing at least one continuous ventilation channel along said inner sides, which ventilation channel leads from an outside into said collector space, and
  j4) said ventilation channel is fluidically connected via at least one opening in said spacers to said space between the inner and outer glass panes.

The said constructions features may be realized in various embodiments, including:

Ad a) and b): The collector may be designed as a so-called frame-collector (German: Rahmenkollektor) or as a so-called tray collector (German: Wannenkollektor). The frame collector has discrete bottom and frame parts, mostly 4 frame parts, which are connected to the bottom. Typically the bottom and frame is a one-piece element in a tray collector and the corner regions are more rounded than those of a frame collector.

If several collectors are directly placed one next to the other, adjacent collectors may have one common (middle) frame part, i.e. some kind of a common middle ridge. This middle frame part differs from a regular frame part just insofar as on both sides connecting elements for the glass panes, absorber sheet, risers etc. are present. Insofar the construction features, disclosed hereinafter with respect to a corner region of a collector, are valid analogously for the design of the middle frame part (middle section) between two associated solar panel. From a construction point the features are just mirrored.

The bottom and the frame can be made from metal, for example aluminum. The frame or the frame parts respectively can be strand casted parts. They may comprise hollow spaces in their axial direction. This includes a profiled channel, preferably at the upper end (rim) of the frame, into which a terminal strip may be screwed to fix the outer glass pane. Ventilation caps may also be fixed in this channel, wherein the inner channel profile serves to hold the screws.

Ad c) and e): The panes of glass can be made from other translucent materials, for example plastics. The support/fixation/arrangement of the glass panes in or at the collector can be realized directly or indirectly (while using intermediate strips, clamps, adapters etc.) at the frame.

The spacers can be adapted correspondingly. A good solution is to provide four spacers, namely one at/along each of the four rims of the glass pane. The spacers thus provide a rectangular frame and may follow each other at their respective ends, i.e. in the corner regions of the collector. Preferably an opening can be arranged in one or more of the corner regions, which connects the space between the glass panes with the remaining inner section of the collector. These opening(s) serve to extend the ventilation channels, provided along the frame parts of the solar collector, fluidically and to allow the air to flow between the glass panes.

The spacers may be profiled rails, featuring a cross section with a T-, U-, V- or L-profile.

Ad f) and g): The construction of the absorber sheet and the riser(s) is not decisive for the invention and may be realized according to prior art. This is true as well for the connection of the riser(s) and a collection pipe and the connection of the risers of one collector with those of an adjacent collector.

Ad h) and i): These features again correspond to state of the art and will not be described in detail. Regarding the risers is should be noted that the plane, along which the pipe(s) extend (adjacent sections of the pipes), is referred to.

Ad j): The ventilation caps are an important feature of the new collector. They are designed such that air may flow from the outside into the collector or vice versa and in such a way that any drillings or openings in the frame are avoided. The profile along the inner face of the caps provides the requested ventilation channels. In the use position of the collector the air enters the ventilation channels at their first, lower section, then flows upwardly along said channels, i.e. between ventilation cap and outer face of the frame). The air is then redirected (around the upper rim of the collector frame) and further continues its flow downwardly into the inner space of the collector.

At another ventilation cap the air flow may be vice versa in order to extract the air from the collector.

The flow path along the ventilation caps will be called ventilation channel, flow channel or air channel, independently in which direction the air flows.

It is important that each of these flow channels along the ventilation caps is fluidly connected with the space provided between inner and outer glass panes. According to the invention this is realized in that an opening is assigned to each flow channel and this opening is arranged between the panes, i.e. where the spacers are, by which the panes are supported.

In other words: Contrary to the double glazing, mentioned above, it is important—according to invention—that the space between the glass panes is permeable to air in least two places.

A forced ventilation for said space between the panes may thus be achieved. Ambient air may flow into the said areas in the inner collector space, may flow through these areas and may then leave the collector analogously.

Further openings at other regions within the collector may allow air to pass further sections of the inner space of the collector, if wanted. In all situations the air on its way along the ventilation channels receives the temperature of the inner collector space and thus will be heated up in most cases.

Generally Spoken:

The described ventilation (air flowing in and out) is achieved by some kind of a labyrinth system (several re-directions of the air flow) and the air is guided along the space between the panes and further sections of the inner space of the collector, if requested.

The ventilation positions may be at the ends of the collector, in particular at its corners, but as well at other places of the frame, for example in the middle of a frame part.

The ventilation system essentially comprises the ventilation caps (at least two to allow a flow through/circulation) and a certain number of openings at different positions in or at the frame. Insofar the term frame comprises all parts, which are linked to the frame directly or indirectly or can be connected to same frame.

The features described may be realized individually or in arbitrary combinations as far as this makes sense under technical aspects. This is true as well for the features of the sub-claims, comprising the following options:

the pattern (profile) of the inner side of the first section, of the second section or of both sections of said ventilation caps comprises at least one notch (groove, a female part) or at least one ridge (tongue, male part).

By these means one or more flow channels are provided. A corrugated profile with parallel extending channels/ridges can be selected, which allows a directed flow.

A profile defined by knobs leads to a flow pattern of undirected/random air flow around the knobs.

Both embodiments are in particular valid for profiling the first section of the cap, which covers the collector frame externally.

At the second section a protruding ridge (rib, partition) may then be sufficient to allow this section having a certain distance to the upper rim of the collector frame and thus providing a slit for the air, which may be sucked in along the first section and effused via the second section.

It is important that air spaces between both sections of said cap and the adjacent parts of said collector exist and that theses spaces are fluidicly connected.

The notch and/or the ridge of the first section of the ventilation cap predominantly extends perpendicular to the bottom.

The notch or the ridge of the first section of the ventilation cap extends along the full inner side of the first section. From a technical point of view it would be sufficient to extend the profile up to the upper rim of the frame (when the cap is placed at the frame) in order to allow the air to continue its flow below the second section.

It is also possible to design the pattern of the inner side of the first section, of the second section or of both sections of said ventilation caps by a multiplicity of discrete knobs, arranged at a distance to each other. In this case a turbulent flow is created.

The profile of the inner side of the second section comprises at least one knob or one ridge, protruding towards the bottom. This was already mentioned above.

The pattern along the inner side of the second section comprises at least one knob or at least one ridge, which rests on the upper front surface of the frame. The air slit is then provided between the frame and the second section of the ventilation cap.

The pattern of the inner side of the second section comprises at least one strip, which projects above the inner side of the second section. This strip may be used to be fastened/latched in the frame or to be fastened/latched at adjacent strips, for example such strips which hold the upper glass pane at the frame.

The spacers between the inner glass pane and the outer glass pane are provided by profiled bars, which extend parallel to outer rims of the glass panes, featuring gaskets/sealings in a contact area to said glass panes.

These spacers then extend along a position corresponding to the rim of an insulating glass pane. The gaskets (sealings) avoid any uncontrolled convection in the inner space of the collector.

The opening in said spacers is provided—at its best—by a short distance (1-10 mm, in particular 1-5 mm) between adjacent profiled bars or within a profiled bar respectively (of same dimensions as mentioned before).

The first variant has the advantage that no additional manufacturing step being necessary. The profiled bar is just shorter compared with the corresponding side of the glass pane.

Adjacent profiled bars are profiled bars, which follow each other in a circumferential direction of the glass panes. The said openings may easily be provided in the corner regions by a corresponding distance of two profiled bars.

There should be at least two such openings, at a distance to each other. A favorable embodiment has openings at opposite sections of both panes, in particular at opposite corner areas.

The ventilation channel can have a further fluidic connection to another area of the collector space, arranged between inner glass pane and bottom, namely by a passage in the resting area for said inner glass pane. This allows forced ventilation as well in other parts/sections of the inner space of the collector.

According to one embodiment the inner glass pane rests on arms, which protrude from said frame. These arms can be connected to other frame parts directly or indirectly.

The passages may again be provided within such arm itself or by a distance between adjacent arms. Insofar the same construction features apply as mentioned in connection with the openings directed into the space between the panes.

According to a variant the frame provides a hole in an axial extension of a strip, via which moisture can escape from the collector space towards the outside. This hole thus has the function of a de-watering hole and will be arranged, in a tilted position of the collector, at its lower end.

Finally the outer glass pane may be hold at its outer side by clamping means, which are fixed to the frame and which limit, together with the ventilation cap, the outer glass pane at its periphery. Preferably the ventilation caps and the clamping means are shaped to allow a corresponding alignment.

Further features of the invention may be derived from the features of the sub-claims as well as from the other application documents.

The invention will now be described by way of an example in more detail. In a schematic representation the following is displayed:

BRIEF DESCRIPTION OF DRAWINGS

FIG. 1: a longitudinal sectional view of a corner area of a solar collector

DETAILED DESCRIPTION

Figure 2A:
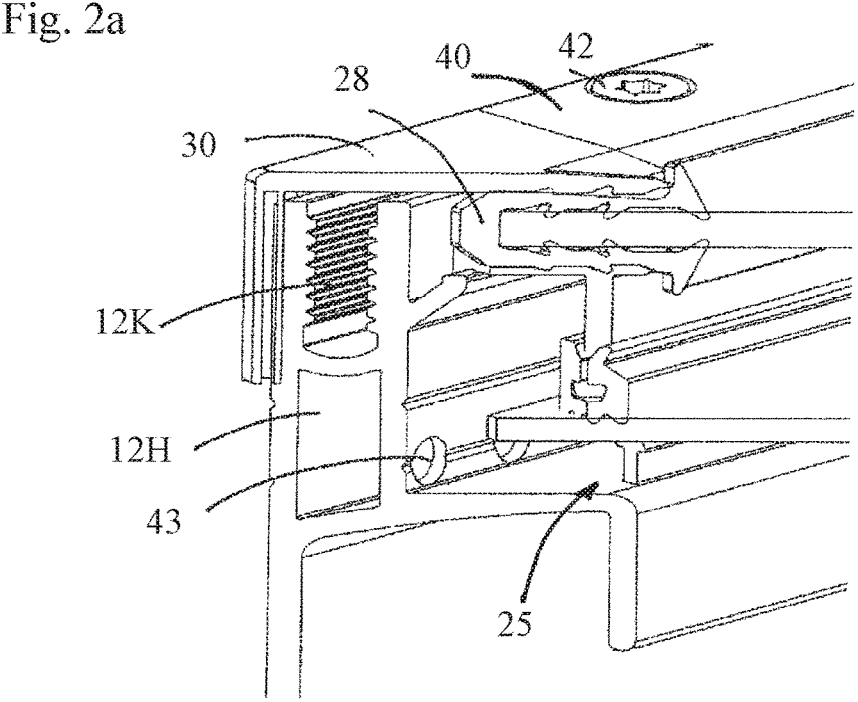
FIG. 2a: a 3-dimensional first view of a corner area, partially cut away, according to FIG. 1, FIG. 2b: a 3-dimensional second view of a corner area, partially cut away, according to FIG. 1, FIG. 3: a top view on the corner area, partially cut away, according to FIG. 1,2

In the Figures, identical parts and parts featuring the same function, are displayed by the same numerals.

The Figures display a solar collector, comprising the following features:

a rectangular bottom 10; a frame 12, extending from an outer periphery of the bottom 10 and perpendicular to said bottom 10, which frame 12 comprises four wall sections W1-W4 and four corner sections E1-E4; an outer, rectangular glass pane 14, which is fastened to said frame 12 at an upper end of said frame 12, which upper end being arranged opposite to said bottom 10; an inner, rectangular glass pane 16, which is fastened to said frame 12 at a first distance A to the outer glass pane 14 between the outer glass pane 14 and the bottom 10, wherein said first distance A between inner and outer glass panes, 16, 14 and thus a space R between inner and outer glass panes 16, 14 is defined by spacers 18, shaped as profiled rails, connecting said inner and outer glass panes 16, 14 at their respective peripheral areas, 16R, 14R; an absorber sheet 20, arranged at a second distance B to said inner glass pane 16 between said inner glass pane 16 and said bottom 10, at least one riser 22 arranged at a third distance C to said bottom 10 between said absorber sheet 20 and said bottom 10, wherein said bottom 10, said frame 12 and said outer glass pane 14 define a box-shaped collector space KR, and wherein the bottom 10, the outer glass pane 14, the inner glass pane 16, the absorber sheet 20 and the riser 22 extend predominantly parallel to each other; as well as at least two ventilation caps 30 arranged at a fourth distance D to each other; and each cap comprising:

a first section 32, abutting with an inner side 32I against an outer side 12A of the frame 12 at the upper end 12E of said frame 12, a second section 34, extending orthogonally/perpendicular to the first section 32, overlapping with an inner side 34I a terminal upper front face 12S of the frame 12, wherein the inner sides 32I, 34I of both first and second sections 32, 34 each display a pattern 32P, 34P, 34Z, providing at least one continuous ventilation channel BK along said inner sides 32I, 34I, which ventilation channel BK leads from an outside into said collector space KR, and wherein said ventilation channel BK is fluidically connected via at least one opening 24 along said spacers 18 to said space R between the inner and outer glass panes 16, 14.

This allows the following ventilation (air entrance, air exit) options for the space R between glass panes 14, 16: air is sucked in from the outside (environment) and from below along the ventilation channels BK, wherein these channels BK are linear channels according to FIG. 4, extending from the free end of the first section 32 to the second section 34. Analogously ridges/tongues are formed between the notched/grooves.

Thus the air flows along said ventilation channels BK between the cap sections 32 and the frame from below upwardly into a free space F, which is provided by the profiling at the second section 34. This part of the pattern is realized by two thickened ridges/zones 34Z (protruding inwardly), protruding from the inner face 34I of section 34, namely in its use position downwardly towards the bottom 10 of the panel. In the mounted version said zone 34Z of the ventilation cap abuts (rests on) the upper free front face 12S of the frame.

Correspondingly air, sucked in via said ventilation channel BK, may flow around said upper front surface 12S into the space F, which in principle follows said ventilation channel BK.

Figure 3:
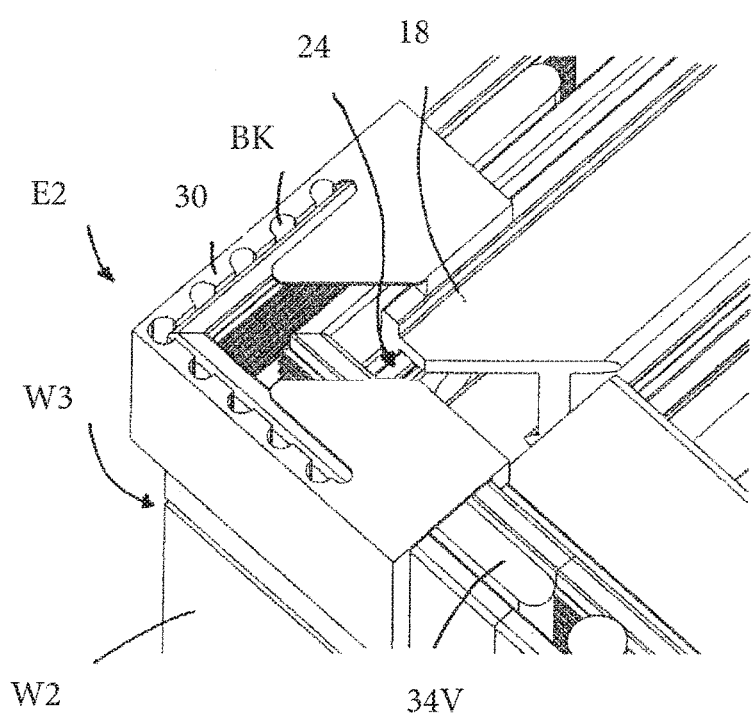

FIG. 3 shows, that the ventilation channel BK merges into an opening 24, which is arranged in a corner region E2 of two profile rails 18. This allows a fluidic connection between ventilation channel BK and space R between the glass panes 14, 16.

The arrangement of the panes of glass 14, 16 may best be explained referring to FIGS. 1 and 2.

At a distance to said front face 12S an arm 12B extends from said frame inwardly (into the collector inner space KR), with a bearing 12L at its upper inner end, onto which the second glass pane 16 rests. A gasket 26 rests on said second glass pane 16, which surrounds a lower end spacer 18, which itself features a T-shaped cross-section. In the mounted position the upper horizontal T leg features an elbow 18K at one end, which fits in a form-fit manner into a groove 12F, arranged in the frame profile 12, namely at the inner side of a double wall upper section 12E.

The first pane of glass 14 rests on the horizontally extending section of said spacer 18, wherein the rim of the glass pane 14 is covered by a sealing 28.

FIG. 1 represents the double wall upper end 12E of the frame 12 by providing a hollow space 12H and a fixation channel 12K, in which an L-shaped bar 40 may be fastened by screws (screw 42), which bar overlaps the upper glass pane 14 at its rim and holds said pane in its position.

In FIG. 1, the said fixation screw 42 is only represented in a schematic way.

The bar 40 extends flush to said ventilation cap 30. In this embodiment each of the four corner areas of the collector is equipped with a ventilation cap 30.

Figure 4:
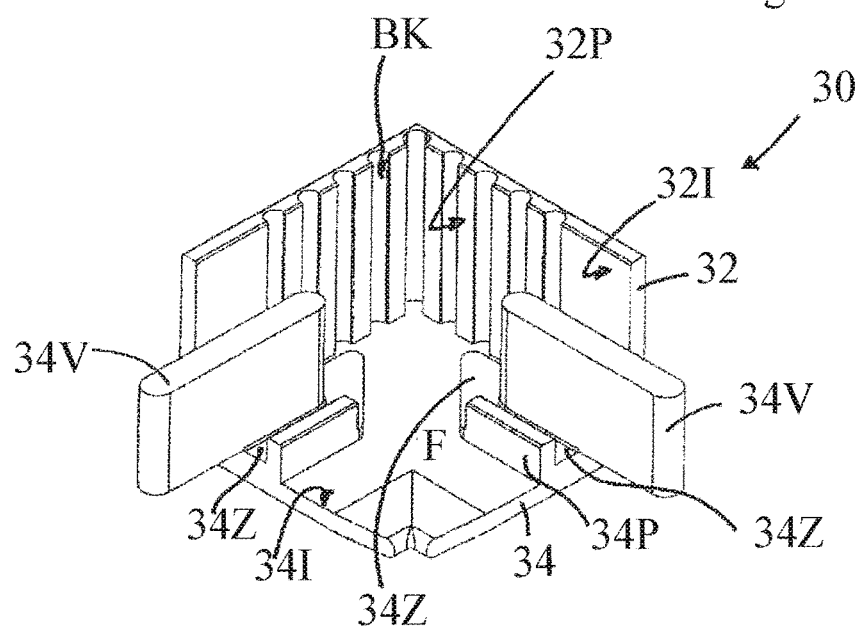
FIG. 4: a 3-dimensional view of a ventilation cap for the corner area of the solar collector according to FIG. 1

As displayed in FIGS. 3 and 4 the fixation of the ventilation caps 30 is realized by locking strips 34V, which are clamped into said fixation channel 12K, and further ridges 34P, abutting the inner side of frame 12, when the collector is fully fitted. That part of each locking strip 34V, protruding section 34, is overlapped and secured by said bar 40.

In the corner areas the bearings 12L have a distance to each other, analogously to said spacers 18 (FIG. 2a), whereby a passage 25 is formed, so that air, flowing into the collector space KR via ventilation channels BK, may also enter lower sections of the collector's inner space KR and analogously may leave the collector space KR.

FIG. 2 shows openings 43 along the inner wall of frame 12 at a position, where said frame is designed as a hollow means 12H, wherein these openings serve to extract any moisture from the collector space KR.

Figure 5:
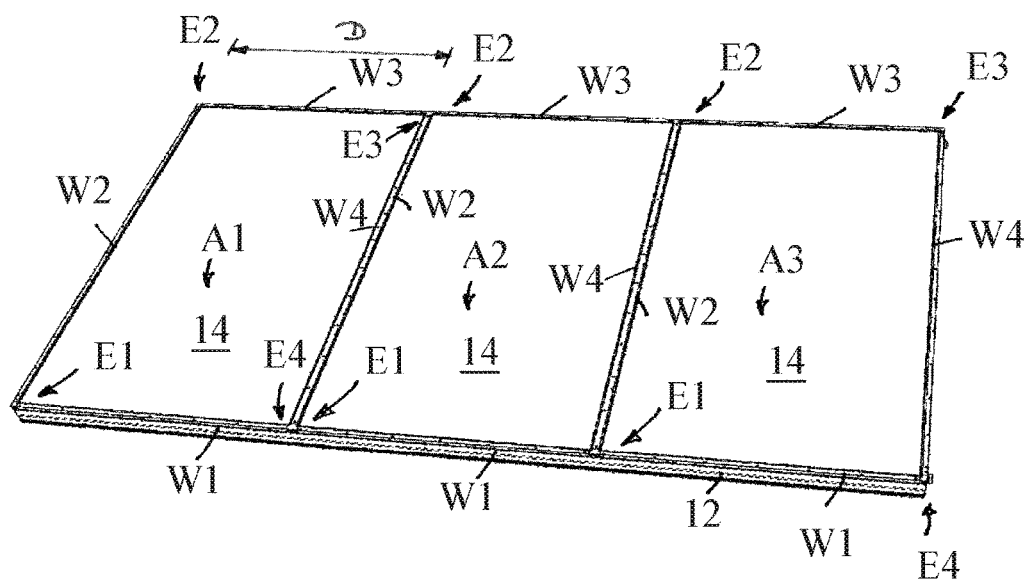
FIG. 5: a full view onto a solar collector

FIG. 5 is a total view of solar panel, made of 3 parts A1, A2 and A3. Each of these parts A1, A2, A3 corresponds to the features disclosed above. For example: part A1 comprises 4 frame sections W1, W2, W3 and W4, which define part A1 together with a bottom (not displayed in FIG. 5) and the upper glass pane 14.

What is special here is that wall W4 represents as well wall W2 of the adjacent part A2, i.e. the wall W4 of A1 and the wall W2 of A2 commonly represent the middle frame part of the overall collector according to FIG. 5. Correspondingly the fixation channels 12K, arms 12B and guiding grooves 12F are realized on both sides of the frame part to allow the integration of corresponding construction parts as glass panes, absorber etc. on both sides of this frame part. In total the overall construction becomes smaller and easier.

The invention claimed is:

1. A solar collector, comprising
a) a rectangular bottom (10),
b) a frame (12), extending from an outer periphery of the rectangular bottom (10) and perpendicular to said bottom (10), which frame (12) comprises four wall sections (W1-W4) and four corner sections (E1-E4),
c) an outer, rectangular glass pane (14), which is fastened to said frame (12) at an upper end (12E) of said frame (12), which upper end being arranged opposite to said rectangular bottom (10),
d) an inner, rectangular glass pane (16), which is fastened to said frame (12) at a distance (A) to the outer, rectangular glass pane (14) between the outer, rectangular glass pane (14) and the rectangular bottom (10), wherein
e) said distance (A) between the inner, rectangular glass pane (16) and the outer, rectangular glass pane (14) and thus a space (R) between the inner and outer, rectangular glass panes (16,14) is defined by spacers (18), connecting the inner and outer, rectangular glass panes (16, 14) at a peripheral area (16R) and a peripheral area (14R) respectively,
f) an absorber sheet (20), arranged at a distance (B) to said inner, rectangular glass pane (16) between said inner, rectangular glass pane (16) and said rectangular bottom (10),
g) at least one riser (22) arranged at distance (C) to said rectangular bottom (10) between said absorber sheet (20) and said rectangular bottom (10), wherein
h) said rectangular bottom (10), said frame (12) and said outer, rectangular glass pane (14) define a box-shaped collector space (KR), and
h) the rectangular bottom (10), the outer, rectangular glass pane (14), the inner, rectangular glass pane (16), the absorber sheet (20) and the at least one riser (22) extend predominantly parallel to each other, as well as i) at least two ventilation caps (30) arranged at a distance (D) to each other, and each cap comprising:
j1) a first section (32), abutting with an inner side (32I) against an outer side (12A) of the frame (12) at an upper end (12E) of said frame (12),
j2) a second section (34), extending orthogonally to the first section (32), overlapping with an inner side (34I) a terminal upper front face (12S) of the frame (12), wherein
j3) the inner sides (32I) of first sections (32) displays a pattern (32P), and the inner side (34I) of second section (34) displays a pattern (34P) and a pattern (34Z) with said pattern (34P), providing a least one continuous ventilation channel (BK) along said inner sides (32I and said inner side 34I), which ventilation channel (BK) leads from an outside into the box-shaped collector space (KR), and
j4) the at least one continuous ventilation channel (BK) is fluidly connected via at least one opening (24) in said spacers (18) to said space (R) between the inner and outer, rectangular glass panes (16, 14).

2. The solar collector according to claim 1, wherein the pattern (32P) of the inner side (32I) of the first section (32), and/or the pattern (34P) and the pattern (34Z) of the inner side (34I) of the second section (34) of the at least two ventilation caps (30) comprises at least one notch or at least one ridge.

3. The solar collector according to claim 2, wherein the notch or the ridge of the first section (32) of the at least two ventilation caps (30) predominantly extends perpendicular to the rectangular bottom (10).

4. The solar collector according to claim 2, wherein the notch or the ridge of the first section (32) of the at least two ventilation caps (30) extends completely along the inner side (32I) of the first section (32).

5. The solar collector according to claim 1, wherein the pattern (34P) and the pattern (34Z) of the inner side (34I) of the second section (34) of the at least two ventilation caps (30) comprises at least one knob or at least one ridge, protruding towards the rectangular bottom (10).

6. The solar collector according to claim 1, wherein the pattern (34P) and the pattern (34Z) of the inner side (34I) of the second section (34) of the at least two ventilation caps (30) comprises at least one knob or at least one ridge, resting on the terminal upper front face (12S) of the frame (12).

7. The solar collector according to claim 1, wherein the pattern (34P) of the inner side (34I) of the second section (34) of the at least two ventilation caps (30) comprises at least one strip (34V), which projects above the inner side (34I) of the second section (34).

8. The solar collector according to claim 1, wherein the spacers (18) between the inner, rectangular glass pane (16) and the outer, rectangular glass pane (14) are provided by profiled bars, which extend parallel to the peripheral area (16R) of the inner, rectangular glass pane (16) and the peripheral area (14R) of the outer, rectangular glass pane (14), featuring a gasket (26) and a gasket (28) in a contact area to the inner and outer, rectangular glass panes (14, 16).

9. The solar collector according to claim 1, wherein the at least one continuous ventilation channel (BK) has a fluidic connection to a section of the box-shaped collector space (KR) between the inner, rectangular glass pane (16) and the rectangular bottom (10), which fluidic connection being provided by at least one passage in a resting area for the inner, rectangular glass pane (16).

10. The solar collector of claim 1, wherein the inner, rectangular glass pane (16) rests with its peripheral area (16R) on an arms (12B), extending from an arm (12L), which protrudes from said frame (12).

11. The solar collector of claim 10, wherein the opening (25) is provided within the arm (12B).

12. The solar collector according to claim 1, wherein the outer glass pane (14) is held at its outer side by claps (40), which are fixed to the frame (12) and which limit, together with the at least two ventilation caps (30), the outer glass pane (14) at its peripheral area (14R).

13. A solar collector comprising:
a rectangular bottom,
a rectangular frame, wherein the frame
   substantially corresponds in shape and is connected to the bottom and extends in a first direction therefrom,
   includes four wall sections,
   includes four corner sections,
      wherein each corner section extends between two immediately adjacent wall sections and terminates in the first direction away from the bottom at a corner section end,
an outer rectangular glass pane, wherein the outer rectangular glass pane
   is in operative attached connection with the frame,
   extends substantially parallel to the bottom,
   is disposed in the first direction from the bottom,
wherein the bottom, the rectangular frame and the outer rectangular glass pane bound a box-shaped collector space,
an inner rectangular glass pane, wherein the inner rectangular glass pane
   is disposed within the box-shaped collector space,
   is disposed in the first direction from the bottom and extends intermediate of the bottom and the outer rectangular glass pane,
   extends substantially parallel to the bottom,
four spacers, wherein the four spacers are positioned within the box shaped collector space,
   wherein each spacer extends in the first direction between and is in connection with a respective peripheral area of each of the outer rectangular glass pane and the inner rectangular glass pane,
   wherein the four spacers and the outer rectangular glass pane and the inner rectangular glass pane bound and intermediate pane space,
      wherein at least one air vent opening extends through the spacers to the intermediate pane space,
an absorber sheet, wherein the absorber sheet
   is disposed within the box shaped collector space,
   is disposed in the first direction from the bottom and is intermediate of the bottom and the inner rectangular glass pane,
   extends substantially parallel to the bottom,
at least one riser, wherein the at least one riser
   extends in the box shaped collector space,
   is disposed in the first direction from the bottom and extends intermediate of the bottom and the absorber sheet,
   extends substantially parallel to the bottom,
at least two ventilation caps,
   wherein each ventilation cap outwardly overlies a respective corner section end of the frame,
   wherein each ventilation cap includes
      a first section, wherein the first section extends substantially parallel to the bottom and in overlying relation of respective corner section end,
      a pair of second sections, wherein each second section is attached to and extends substantially perpendicular to the first section,
         wherein each second section extends substantially parallel to and in outward overlying relation of a respective immediately adjacent side wall section at the respective corner section,
      at least one air passage, wherein the at least one air passage extends intermediate of each respective second section and a respective underlying wall section from at least one air passage end opening that is open to outside the box shaped collector space and faces in an opposed direction of the first direction, and wherein the at least one air passage is in fluid connection with the box shaped collector space, the at least one air vent opening and the intermediate pane space,
      whereby at least one ventilation channel including the at least one air passage fluidly extends between outside the box shaped collector space and the intermediate pane space.

14. The solar collector according to claim 13
wherein the at least one air passage comprises a plurality of separated spaced air passages in each of the second sections, each of which air passages
   extends substantially parallel to the first direction,
   and terminates in a respective air passage end opening.

15. The solar collector according to claim 13
wherein the frame includes at least two opposed inwardly directed arms, wherein each of the inwardly directed arms
   are in the box shaped collector space, and
   extend substantially perpendicular to the first direction,
wherein the inner rectangular glass pane is supported on the at least two opposed inwardly directed arms and is disposed in the first direction from each of the two opposed inwardly directed arms.

* * * * *